(12) United States Patent
Bashir

(10) Patent No.: US 11,632,271 B1
(45) Date of Patent: Apr. 18, 2023

(54) LOCATION-BASED CHANNEL ESTIMATION IN WIRELESS COMMUNICATION SYSTEMS

(71) Applicant: T-Mobile USA, Inc., Bellevue, WA (US)

(72) Inventor: Shahzad Bashir, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 17/680,193

(22) Filed: Feb. 24, 2022

(51) Int. Cl.
H04L 25/02 (2006.01)
H04B 17/336 (2015.01)
H04W 64/00 (2009.01)

(52) U.S. Cl.
CPC ....... *H04L 25/0204* (2013.01); *H04B 17/336* (2015.01); *H04L 25/024* (2013.01); *H04L 25/0228* (2013.01); *H04W 64/006* (2013.01)

(58) Field of Classification Search
CPC ............. H04L 25/0204; H04L 25/0228; H04L 25/024; H04B 17/336; H04W 64/006
See application file for complete search history.

(56) References Cited

U.S. PATENT DOCUMENTS

| | | | |
|---|---|---|---|
| 6,236,365 B1 | 5/2001 | Leblanc et al. | |
| 6,452,915 B1 | 9/2002 | Jorgensen | |
| 6,456,652 B1 | 9/2002 | Kim et al. | |
| 6,680,922 B1 | 1/2004 | Jorgensen | |
| 6,845,238 B1 | 1/2005 | Mueller | |
| 6,862,622 B2 | 3/2005 | Jorgensen | |
| 6,904,024 B1 | 6/2005 | Boch et al. | |
| 6,993,361 B2 | 1/2006 | Chitrapu | |
| 7,058,405 B2 | 6/2006 | Chandra et al. | |
| 7,117,015 B2 | 10/2006 | Scheinert et al. | |
| 7,212,821 B2 | 5/2007 | Laroia et al. | |
| 7,231,220 B2 | 6/2007 | Reddy et al. | |
| 7,299,069 B2 | 11/2007 | Claussen | |
| 7,430,420 B2 | 9/2008 | Derakhshan et al. | |
| 7,477,920 B2 | 1/2009 | Scheinert et al. | |
| 7,583,619 B2 | 9/2009 | Edwards | |
| 7,640,008 B2 | 12/2009 | Gallagher et al. | |
| 7,660,573 B2 | 2/2010 | Elmaleh | |
| 7,764,231 B1 | 7/2010 | Karr et al. | |
| 7,817,997 B2 | 10/2010 | Nylander et al. | |

(Continued)

FOREIGN PATENT DOCUMENTS

DE 19843982 B4 7/2006
DE 202009000648 U1 4/2009

(Continued)

*Primary Examiner* — Jaison Joseph
(74) *Attorney, Agent, or Firm* — Perkins Coie LLP

(57) ABSTRACT

Systems, methods, and devices to reduce the channel estimation overhead by collecting data from many UEs and building a location-based mathematical model are disclosed. During building of the model, a reference signal is used to collect location- and signal-related data from connected UEs. Once the model is successfully built, it is then transmitted and/or downloaded to each new UE that connects to the base station. The UEs and/or the base stations then use this model to determine their own transmission parameter values. The UEs also report their location to the base stations, which use the model to estimate channel conditions and adapt transmission parameters for themselves.

20 Claims, 8 Drawing Sheets

(56) References Cited

U.S. PATENT DOCUMENTS

| | | |
|---|---|---|
| 7,844,273 B2 | 11/2010 | Scheinert |
| 7,853,264 B1 | 12/2010 | Oh |
| 7,940,740 B2 | 5/2011 | Krishnamurthy et al. |
| 8,041,335 B2 | 10/2011 | Khetawat et al. |
| 8,073,428 B2 | 12/2011 | Khetawat et al. |
| 8,086,239 B2 | 12/2011 | Elmaleh |
| 8,095,170 B2 | 1/2012 | Lopes |
| 8,112,096 B2 | 2/2012 | Mazlum et al. |
| 8,121,100 B2 | 2/2012 | Robson et al. |
| 8,125,921 B2 | 2/2012 | Frenger et al. |
| 8,145,271 B2 | 3/2012 | Ishii |
| 8,184,603 B2 | 5/2012 | Waylett et al. |
| 8,194,630 B2 | 6/2012 | Qvarfordt et al. |
| 8,224,329 B2 | 7/2012 | Van et al. |
| 8,249,033 B2 | 8/2012 | Chu et al. |
| 8,259,637 B2 | 9/2012 | Bertrand et al. |
| 8,315,629 B2 | 11/2012 | Pamp et al. |
| 8,320,331 B2 | 11/2012 | Vikberg et al. |
| 8,326,310 B2 | 12/2012 | Hu |
| 8,385,220 B2 | 2/2013 | Ryan |
| 8,401,479 B2 | 3/2013 | Cai et al. |
| 8,422,885 B2 | 4/2013 | Adhikari et al. |
| 8,428,584 B2 | 4/2013 | Buckley et al. |
| 8,457,644 B2 | 6/2013 | Schmidt et al. |
| 8,498,241 B1 | 7/2013 | Talley et al. |
| 8,792,851 B2 | 7/2014 | Matsumura et al. |
| 9,564,957 B2 | 2/2017 | Balraj et al. |
| 9,572,078 B2 | 2/2017 | Zhang et al. |
| 9,572,108 B2 | 2/2017 | Schmidt et al. |
| 9,578,564 B2 | 2/2017 | Ishii |
| 9,578,671 B2 | 2/2017 | Blankenship et al. |
| 9,591,597 B2 | 3/2017 | Son et al. |
| 9,596,067 B2 | 3/2017 | Kim et al. |
| 9,596,609 B2 | 3/2017 | Chaudhuri et al. |
| 9,596,707 B2 | 3/2017 | Zhu et al. |
| 9,603,036 B2 | 3/2017 | Ljung |
| 9,622,095 B2 | 4/2017 | Ma et al. |
| 9,622,133 B1 | 4/2017 | Guvenc |
| 9,622,150 B2 | 4/2017 | Caretti et al. |
| 9,622,170 B2 | 4/2017 | Zhu et al. |
| 9,622,192 B2 | 4/2017 | Ji |
| 9,628,215 B2 | 4/2017 | Tan et al. |
| 9,628,228 B2 | 4/2017 | Yoo et al. |
| 9,655,102 B2 | 5/2017 | Uplenchwar et al. |
| 9,668,099 B2 | 5/2017 | Davydov et al. |
| 9,674,776 B2 | 6/2017 | Park et al. |
| 9,681,456 B2 | 6/2017 | Son et al. |
| 9,699,601 B2 | 7/2017 | Grayson et al. |
| 9,706,423 B2 | 7/2017 | Horn et al. |
| 9,716,559 B2 | 7/2017 | Chou |
| 9,717,030 B2 | 7/2017 | Qin |
| 9,723,607 B2 | 8/2017 | Long |
| 9,736,700 B1 | 8/2017 | Douberley et al. |
| 9,749,948 B2 | 8/2017 | Kwun |
| 9,788,328 B2 | 10/2017 | Tavildar et al. |
| 9,794,033 B2 | 10/2017 | Fwu et al. |
| 9,794,809 B2 | 10/2017 | Chou et al. |
| 9,794,820 B1 | 10/2017 | Marupaduga et al. |
| 9,794,870 B2 | 10/2017 | Vannithamby et al. |
| 9,794,972 B2 | 10/2017 | Lu et al. |
| 9,801,167 B2 | 10/2017 | Moulsley et al. |
| 9,814,037 B2 | 11/2017 | Xue et al. |
| 9,843,687 B2 | 12/2017 | Campbell et al. |
| 9,848,432 B2 | 12/2017 | Lee et al. |
| 9,853,667 B2 | 12/2017 | Lim et al. |
| 9,860,031 B2 | 1/2018 | Kim et al. |
| 9,871,568 B2 | 1/2018 | Jung et al. |
| 9,877,307 B2 | 1/2018 | Song et al. |
| 9,894,627 B2 | 2/2018 | Choi et al. |
| 9,894,698 B2 | 2/2018 | Tsai et al. |
| 9,913,191 B2 | 3/2018 | Schmidt et al. |
| 9,918,238 B2 | 3/2018 | Chou |
| 9,923,681 B2 | 3/2018 | Zakrzewski et al. |
| 9,936,373 B2 | 4/2018 | Schier et al. |
| 9,936,463 B2 | 4/2018 | Tang et al. |
| 9,936,469 B2 | 4/2018 | Ji et al. |
| 9,955,410 B2 | 4/2018 | Li et al. |
| 9,973,997 B1 | 5/2018 | Karabulut et al. |
| 9,974,089 B2 | 5/2018 | Salem et al. |
| 10,694,477 B2 * | 6/2020 | Axén ............... H04B 7/0617 |
| 11,509,355 B2 * | 11/2022 | Nam ............... H04B 7/024 |
| 2004/0176097 A1 | 9/2004 | Wilson et al. |
| 2005/0014533 A1 | 1/2005 | Cave et al. |
| 2005/0272472 A1 | 12/2005 | Goldberg et al. |
| 2006/0003760 A1 | 1/2006 | Li et al. |
| 2006/0142020 A1 | 6/2006 | Mueckenheim et al. |
| 2006/0165032 A1 | 7/2006 | Hamalainen et al. |
| 2006/0217093 A1 | 9/2006 | Wang et al. |
| 2006/0250996 A1 | 11/2006 | Mella et al. |
| 2006/0276202 A1 | 12/2006 | Moeglein et al. |
| 2007/0004404 A1 | 1/2007 | Buckley et al. |
| 2008/0287139 A1 | 11/2008 | Carlson et al. |
| 2008/0318596 A1 | 12/2008 | Tenny |
| 2009/0046665 A1 | 2/2009 | Robson et al. |
| 2009/0092081 A1 | 4/2009 | Balasubramanian et al. |
| 2009/0129350 A1 | 5/2009 | Khandekar et al. |
| 2009/0143065 A1 | 6/2009 | Mattila |
| 2009/0213825 A1 | 8/2009 | Gupta et al. |
| 2009/0215460 A1 | 8/2009 | Hasegawa |
| 2009/0247170 A1 | 10/2009 | Balasubramanian et al. |
| 2010/0080139 A1 | 4/2010 | Palanki et al. |
| 2010/0105377 A1 | 4/2010 | Iwamura et al. |
| 2010/0118847 A1 | 5/2010 | Lee et al. |
| 2010/0135176 A1 | 6/2010 | Kazmi et al. |
| 2010/0165862 A1 | 7/2010 | Nylander et al. |
| 2010/0197309 A1 | 8/2010 | Fang et al. |
| 2010/0210268 A1 | 8/2010 | Lim et al. |
| 2010/0220597 A1 | 9/2010 | Ji et al. |
| 2010/0246440 A1 | 9/2010 | Catovic |
| 2010/0265842 A1 | 10/2010 | Gorokhov et al. |
| 2010/0296405 A1 | 11/2010 | Madan et al. |
| 2010/0298005 A1 | 11/2010 | Tokgoz et al. |
| 2010/0323627 A1 | 12/2010 | Alanara |
| 2011/0007643 A1 | 1/2011 | Liang et al. |
| 2011/0009065 A1 | 1/2011 | Carter |
| 2011/0013568 A1 | 1/2011 | Yim et al. |
| 2011/0044264 A1 | 2/2011 | Chen et al. |
| 2011/0053604 A1 | 3/2011 | Kim et al. |
| 2011/0076960 A1 | 3/2011 | Yun et al. |
| 2011/0085536 A1 | 4/2011 | Taoka et al. |
| 2011/0110261 A1 | 5/2011 | Frenger |
| 2011/0117834 A1 | 5/2011 | Martin |
| 2011/0117916 A1 | 5/2011 | Dahlen |
| 2011/0117942 A1 | 5/2011 | Kazmi et al. |
| 2011/0183675 A1 | 7/2011 | Bae et al. |
| 2011/0256894 A1 | 10/2011 | Khandelia et al. |
| 2011/0299446 A1 | 12/2011 | Chun et al. |
| 2011/0300842 A1 | 12/2011 | Bjorken |
| 2011/0305180 A1 | 12/2011 | Oesterling |
| 2011/0306291 A1 | 12/2011 | Ma et al. |
| 2012/0004001 A1 | 1/2012 | Power et al. |
| 2012/0044816 A1 | 2/2012 | Ratasuk et al. |
| 2012/0099453 A1 | 4/2012 | Saagfors et al. |
| 2012/0100845 A1 | 4/2012 | Mildh et al. |
| 2012/0129562 A1 | 5/2012 | Stamoulis et al. |
| 2012/0195219 A1 | 8/2012 | Ko et al. |
| 2012/0207120 A1 | 8/2012 | Bark et al. |
| 2012/0269143 A1 | 10/2012 | Bertrand et al. |
| 2012/0281582 A1 | 11/2012 | Yang et al. |
| 2012/0282864 A1 | 11/2012 | Dimou et al. |
| 2012/0282979 A1 | 11/2012 | Ashraf et al. |
| 2012/0289283 A1 | 11/2012 | Jiang et al. |
| 2012/0329448 A1 | 12/2012 | Lim |
| 2013/0005382 A1 | 1/2013 | Landstrom et al. |
| 2013/0028107 A1 | 1/2013 | Ho et al. |
| 2013/0039194 A1 | 2/2013 | Siomina et al. |
| 2013/0079021 A1 | 3/2013 | Centonza |
| 2013/0094595 A1 | 4/2013 | Dimou et al. |
| 2013/0143573 A1 | 6/2013 | Basu et al. |
| 2013/0148600 A1 | 6/2013 | Moulsley et al. |
| 2013/0155991 A1 | 6/2013 | Kazmi et al. |
| 2013/0163440 A1 | 6/2013 | Issakov et al. |
| 2013/0183991 A1 | 7/2013 | Bosch et al. |

(56) References Cited

U.S. PATENT DOCUMENTS

| | | | |
|---|---|---|---|
| 2015/0038156 A1* | 2/2015 | Kilpatrick, II | H04W 52/50 455/561 |
| 2017/0048721 A1 | 2/2017 | Sun et al. | |
| 2017/0201976 A1* | 7/2017 | Yue | H04W 72/048 |
| 2017/0223696 A1 | 8/2017 | Qin | |
| 2017/0280288 A1 | 9/2017 | Do et al. | |
| 2017/0303141 A1 | 10/2017 | Islam et al. | |
| 2022/0014933 A1* | 1/2022 | Moon | H04W 16/225 |
| 2022/0400042 A1* | 12/2022 | Horn | H04W 24/08 |
| 2022/0400470 A1* | 12/2022 | Kusashima | H04W 72/0453 |

FOREIGN PATENT DOCUMENTS

| | | |
|---|---|---|
| DE | 102010027434 A1 | 1/2012 |
| DE | 112010003783 T5 | 12/2012 |
| DE | 112013002183 T5 | 12/2014 |
| DE | 102014207027 A1 | 10/2015 |
| DE | 102016004256 A1 | 10/2016 |
| DE | 112014005501 B4 | 12/2021 |
| EP | 1098539 A2 | 5/2001 |
| EP | 3322207 B1 | 1/2020 |
| KR | 100621329 B1 | 9/2006 |
| KR | 100719613 B1 | 5/2007 |
| KR | 101207452 B1 | 12/2012 |
| KR | 101485515 B1 | 1/2015 |
| KR | 101587306 B1 | 1/2016 |
| KR | 101599472 B1 | 3/2016 |
| KR | 101823293 B1 | 1/2018 |
| WO | 03063404 A2 | 7/2003 |
| WO | 2010067625 A1 | 6/2010 |
| WO | 2013024349 A2 | 2/2013 |
| WO | 2013177768 A1 | 12/2013 |
| WO | 2014127516 A1 | 8/2014 |
| WO | 2015013924 A1 | 2/2015 |
| WO | 2015161519 A1 | 10/2015 |
| WO | 2016123945 A1 | 8/2016 |

* cited by examiner

LOCATION-BASED CHANNEL ESTIMATION IN WIRELESS COMMUNICATION SYSTEMS

BACKGROUND

Channel estimation plays a very important role in the performance of wireless communication systems.

BRIEF DESCRIPTION OF THE DRAWINGS

Detailed descriptions of implementations of the present invention will be described and explained through the use of the accompanying drawings.

Figure 1:
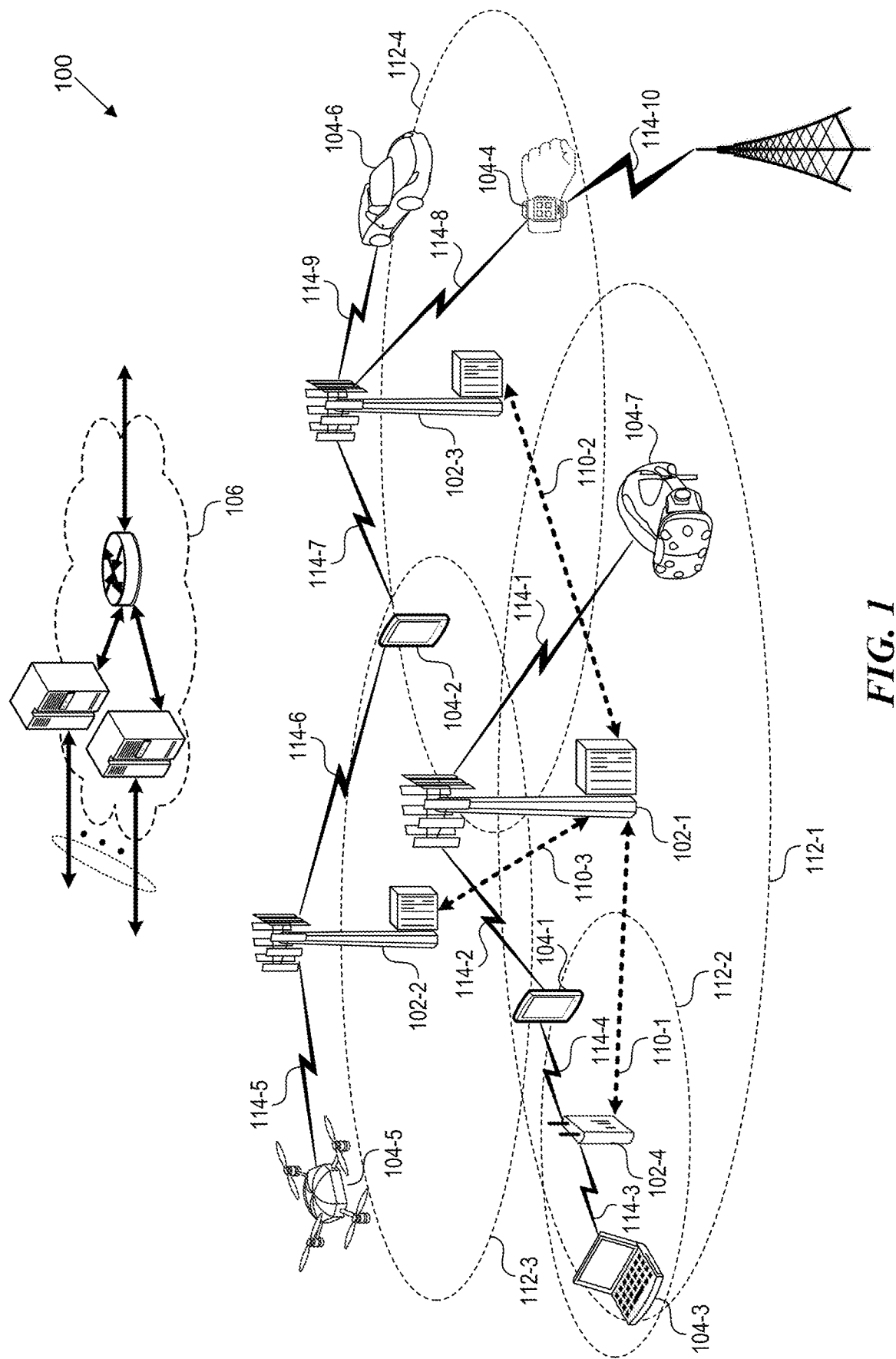
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In wireless cellular communication systems, the quality of signal received by a user equipment (UE, e.g., a mobile phone) or a base station (BS) heavily depends on the physical location of the UE. Hence, when the UE is mobile, frequent estimation of signal quality is needed. This estimation (also known as channel estimation) is generally performed based on a specific signal (also known as a reference signal).

In one method, the reference signal can be transmitted by the base station and received by the UE. The UE measures the power of the reference signal (or signal-to-noise-ratio (SNR) or signal-to-interference-and-noise-ratio (SINR)) and sends the measured value back to the base station. The base station uses this value to estimate the radio channel conditions that the UE is experiencing. Based on this estimation, the base station determines optimal values of several transmission parameters (such as modulation schemes, multiple-input and multiple-output (MIMO) rank, and so on). Values of these parameters are then sent to the UE, which adapts its subsequent transmitted signal accordingly.

In another method, the UE sends a reference signal to the base station, which measures its power level (or SNR/SINR) and reports back to the UE. Both the UE and the base station determine optimal values of the transmission parameters according to the measurement report.

This process is repeated periodically and frequently for every UE connected to the base station and each time new channel estimation is performed. These methods create a lot of overhead in that they use part of a frequency band (spectrum) and time slots for channel estimation and not for payload. This results in poor utilization of the spectrum, that is, low spectral efficiency. As a result, conventional methods of channel estimation consume extensive wireless resources, and also result in a degraded user experience due to reduced data throughput.

To overcome these and other deficiencies of conventional systems, the inventor has conceived and reduced to practice systems and methods to reduce the channel estimation overhead by collecting data from many UEs and building a location-based mathematical model. During building of the model, a reference signal can be used as in the conventional systems. However, once the model is successfully built, it is then transmitted and/or downloaded to each new UE that connects to the base station. The UEs and/or the base stations then use this model to determine their own transmission parameter values. The UEs also report their location to the base station which uses the model to estimate channel conditions and adapt transmission parameters for themselves. In this manner, a reference signal as in conventional systems is no longer used for channel estimation or is only sporadically used. Hence the spectrum and time slots used by the reference signal are freed up to be used for payload. This increases data throughput and spectral efficiency, which in turn increases the value of telecommunication assets by obtaining more data throughput from each MHz. It also improves user experience because more bandwidth is made available for data use and transmission rather than for channel estimation—related payload.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network formed by the system 100 also include wireless devices 104-1 through 104-7 (referred to individually as "wireless device 104" or collectively as "wireless devices 104") and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution (LTE)/LTE advanced (LTE-A) communication channel, which is referred to as a 4G communication channel. In some implementations, the base station 102 can provide network access to a fifth-generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc. The base stations 102 can host the channel estimation model(s) at, for example, local and/or remote memory locations.

The system 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), and a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network. A wireless device can use various techniques to determine its location, such as an on-board global positioning system (GPS) (e.g., which provides x,y coordinates and an altitude meter to provide a z coordinate). While not necessary, it is useful to know a wireless device's location in the z coordinate (i.e., height above ground) since that can also have an effect on signal quality. The wireless device also has a memory to store one or more channel models received from a base station.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in system 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input and multiple-output (MIMO) techniques that can take advantage of multi-path environments to transmit multiple spatial layers carrying the same or different coded data.

Location-Based Channel Estimation—Model Creation

Figure 2:
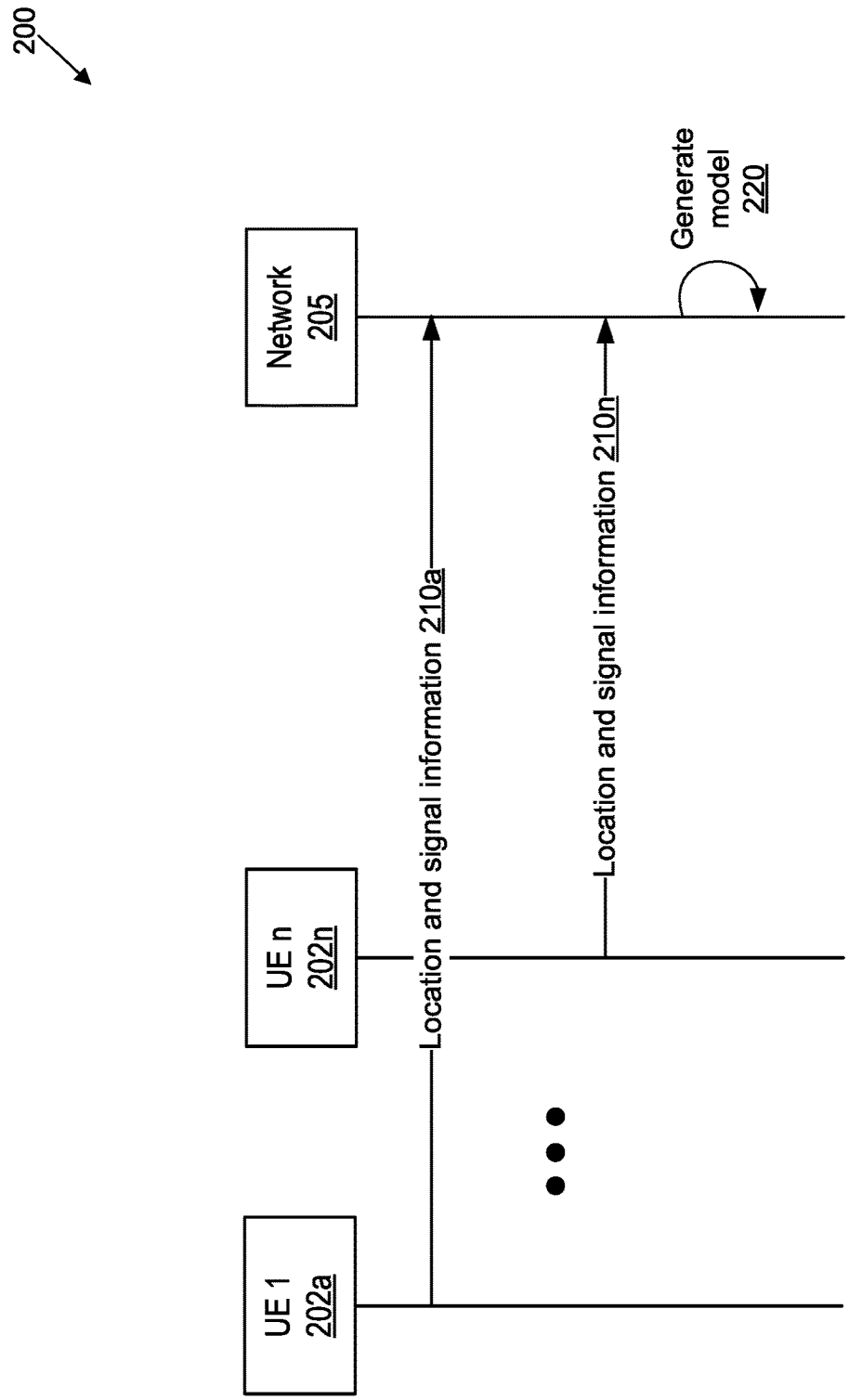
FIG. 2 illustrates an example call flow for channel estimation model creation.

FIG. 2 illustrates an example call flow 200 for channel estimation model creation. Once a UE (202a, . . . , 202n) is connected to a network 205 via a base station, it sends its location information, such as GPS coordinates, in every transmission or data packet 210a, . . . , 210n, along with the power measurement report (or SNR, SINR) of the reference signal. The network 205 (e.g., via the base station) collects that information from multiple UEs 202a, . . . , 202n that pass through that physical location, correlates their power measurement reports to that physical location, and formulates a set of mathematical models (such as a statistical distribution, trained machine learning model, and so on) of the signal attenuation parameters, such as power, signal strength, SNR, SINR, reference signal received power (RSRP), reference signal strength indication (RSSI), and so on. The network 205 can create (at 220) one or more models for each of the signal attenuation parameters. The model(s) can then be used to estimate values for corresponding channel transmission parameter(s) at the UEs and/or the base station. Examples of channel transmission parameters include, but are not limited to, modulation scheme, multiple-input and multiple-output (MIMO) rank, transmit power level, channel bandwidth, number of carriers, number of sub-carriers, sub-carrier spacing, and so on.

Figure 7:
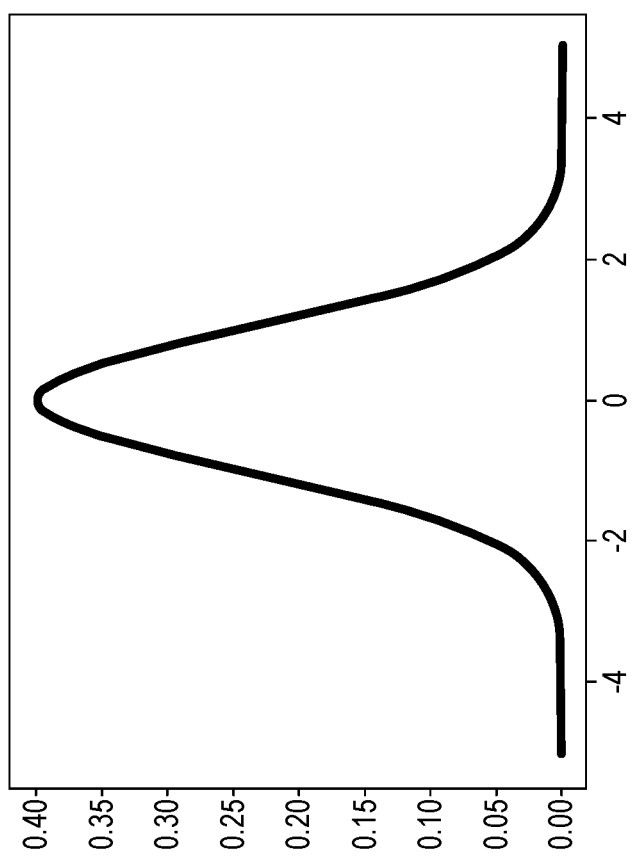
FIG. 7 illustrates an example model used to determine channel transmission parameters in accordance with one or more embodiments of the present technology.

For example, the network 205 can generate a model illustrated in FIG. 7 for a UE location (x1, y1, z1). The model indicates that the SINR is most likely to be around 0 dB at this location for any given UE. Hence, this is the value that should be used by the UE or the base station to determine the channel transmission parameters, such as MIMO rank and modulation scheme.

In some implementations, the network 205 generates separate models for uplink and downlink directions. For example, the model can be the same for uplink and downlink (such as in TDD systems) or different for uplink and downlink (such as in FDD systems).

In some implementations, the network 205 generates separate models for different bands (e.g., a set of models for the 600 MHz band and a set of models for the 3 GHz systems) of base stations. In this manner, the disclosed systems and methods can address attenuation and other signal-dampening problems for different frequency bands.

Network 205 can store the models in one or more data storage locations remotely accessible by the various base stations. For ease of retrieval and usage, the models can be associated with identifiers for one or more base stations with which they are associated. In some implementations, the models are stored in data storage locations locally accessible by specific base stations. The models can be refreshed/recomputed at periodic intervals (e.g., monthly, quarterly, etc.), when specific events occur (e.g., a new telecommunications service is rolled out), when changes are made to the telecommunications network (e.g., a cell tower is added/removed), and so on.

Figure 4A:
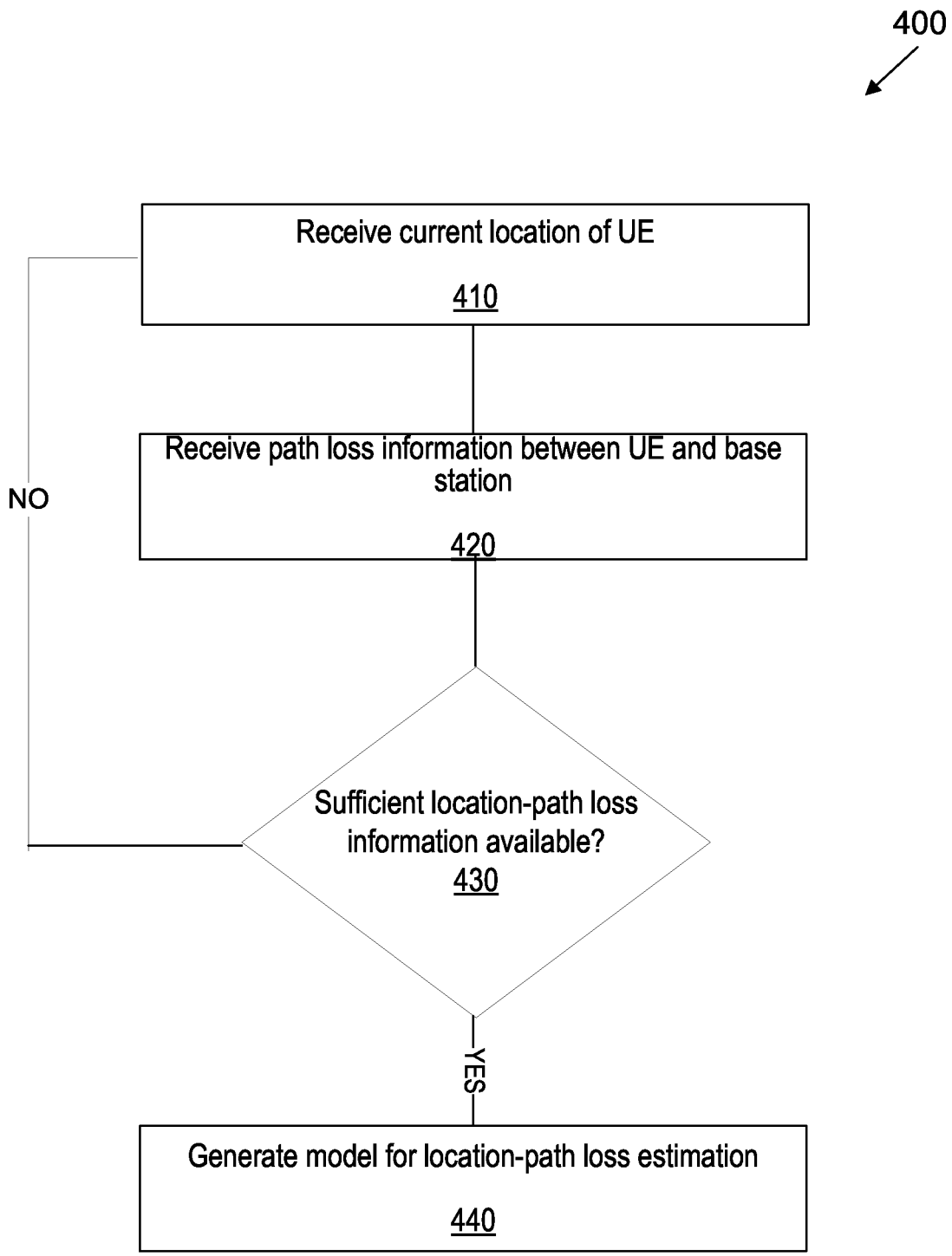
FIG. 4A is a flow chart representation of a method for wireless communication in accordance with one or more embodiments of the present technology.

FIG. 4A is a flow chart representation of a process 400 for wireless communication performed by, for example, a node (e.g., base station) in a telecommunications network. At acts 410 and 420, the network node receives a current location for a UE and associated path loss information in the form of one or more signal attenuation parameter values. At block 430, process 400 determines whether it has received sufficient path loss information for a location (e.g., a base station coverage area, a particular location (e.g., represented as x-y-z coordinates), an area surrounding a particular location (e.g., a 10 square mile radius area surrounding a location), and so on) so that a set of models can be generated. Process 400 performs acts 410-430 until sufficient location-path loss information is available. When sufficient location-path loss information is available, process 400 proceeds to act 440 where it generates one or more models, as discussed above.

Location-Based Channel Estimation—Model Usage

Figure 3:
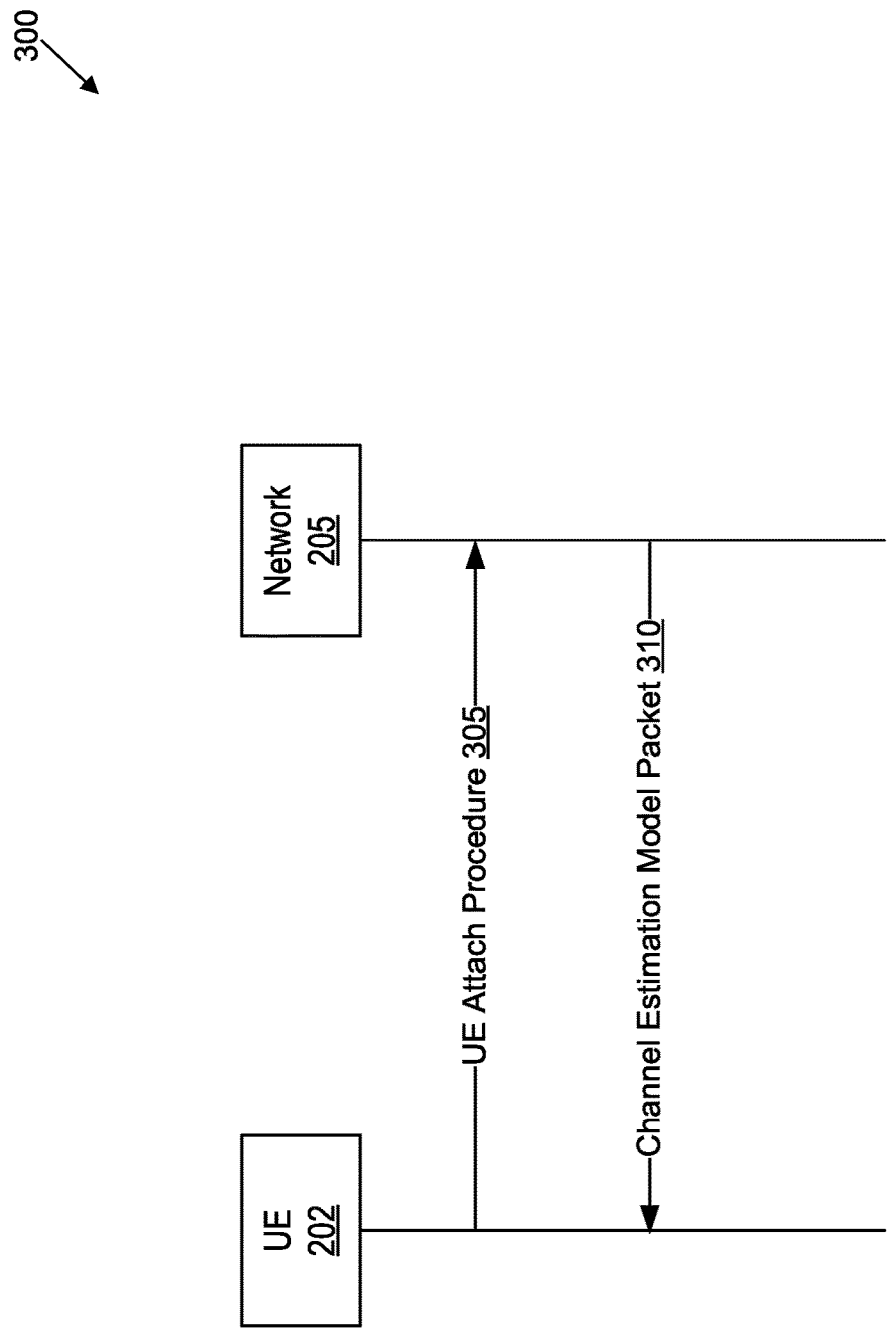
FIG. 3 illustrates an example call flow for channel estimation model usage.

FIG. 3 illustrates an example call flow for channel estimation model transfer and usage. When a UE 202 attaches to a network 205 (e.g., using an attachment notification to connect to a base station 305), the network 205 determines the base station and/or frequency band for communications between the UE 202 and the network 205. Based on the identified base station and/or frequency band, and/or type of UE the network 205 identifies one or more models applicable for the UE 202. For example, when it is determined that communications between the UE 202 and a base station of the network 205 will occur over the 3 GHz frequency band, network 205 can select a set of models corresponding to the 3 GHz frequency band. As another example, during carrier aggregation/dual connectivity, when it is determined that communications between the UE 202 and a base station of the network 205 will occur over both the low band and mid band, the network selects two sets of models, each corresponding to the two frequency bands.

Additionally, the network 205 can select models for some, but not all, of the signal attenuation parameters based upon, for example, the features of the UE, features of the base station, type of communications being supported, and so on. After the model(s) are identified, they are then made available to any UE that enters the base station's coverage area and connects to it. For example, the network 205 transmits one or more channel estimation model packets 310 that comprise the identified model(s). As another example, the models are stored at a data storage location communicatively coupled to the terminal device, and the terminal device is configured to access the identified subset of models from the data storage location using the information in the received packet (e.g., model identifiers). In some implementations, instead of selecting a subset of models, all models for the base stations are made available to the UE.

The model(s) are then used by the UE and/or the base station to estimate channel parameters at that particular location of the UE without going through the cumbersome channel estimation process used in conventional systems.

This reduces the overhead and increases communication efficiency over that frequency channel, also known as increased spectral efficiency.

Figure 4B:
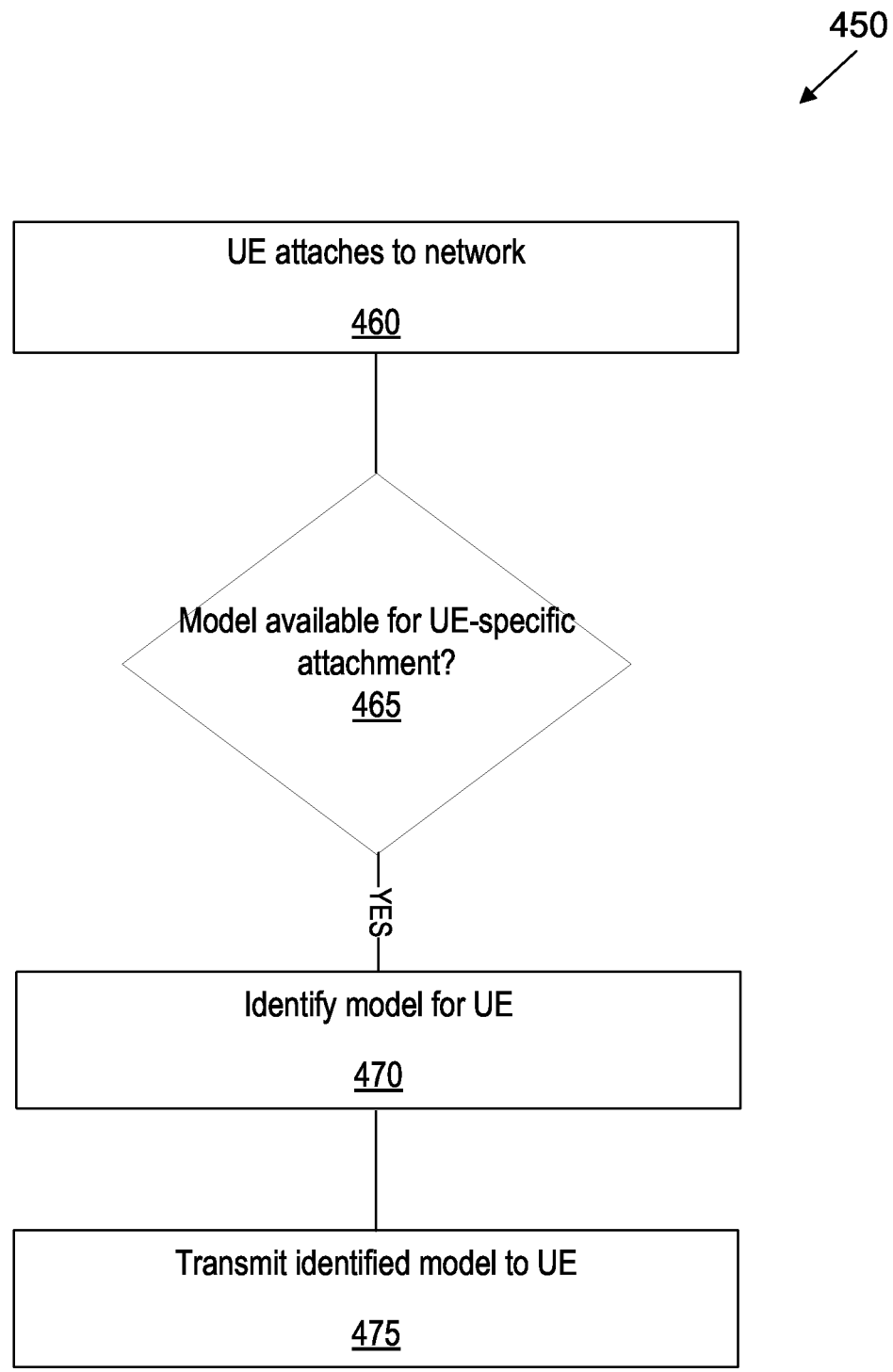
FIG. 4B is a flow chart representation of a method for wireless communication in accordance with one or more embodiments of the present technology.

FIG. 4B is a flow chart representation of a process 450 for wireless communication performed at a UE in a telecommunications network. Process 450 begins at act 460 when a UE attaches to a network node (e.g., base station). At act 465, process 450 determines whether a model is available for the UE-specific attachment (for example, for a frequency band over which communications between the UE and the network will occur). At act 470, process 450 identifies the set of models for the UE and transmits one or more of the identified models to the UE at act 475.

Figure 5:
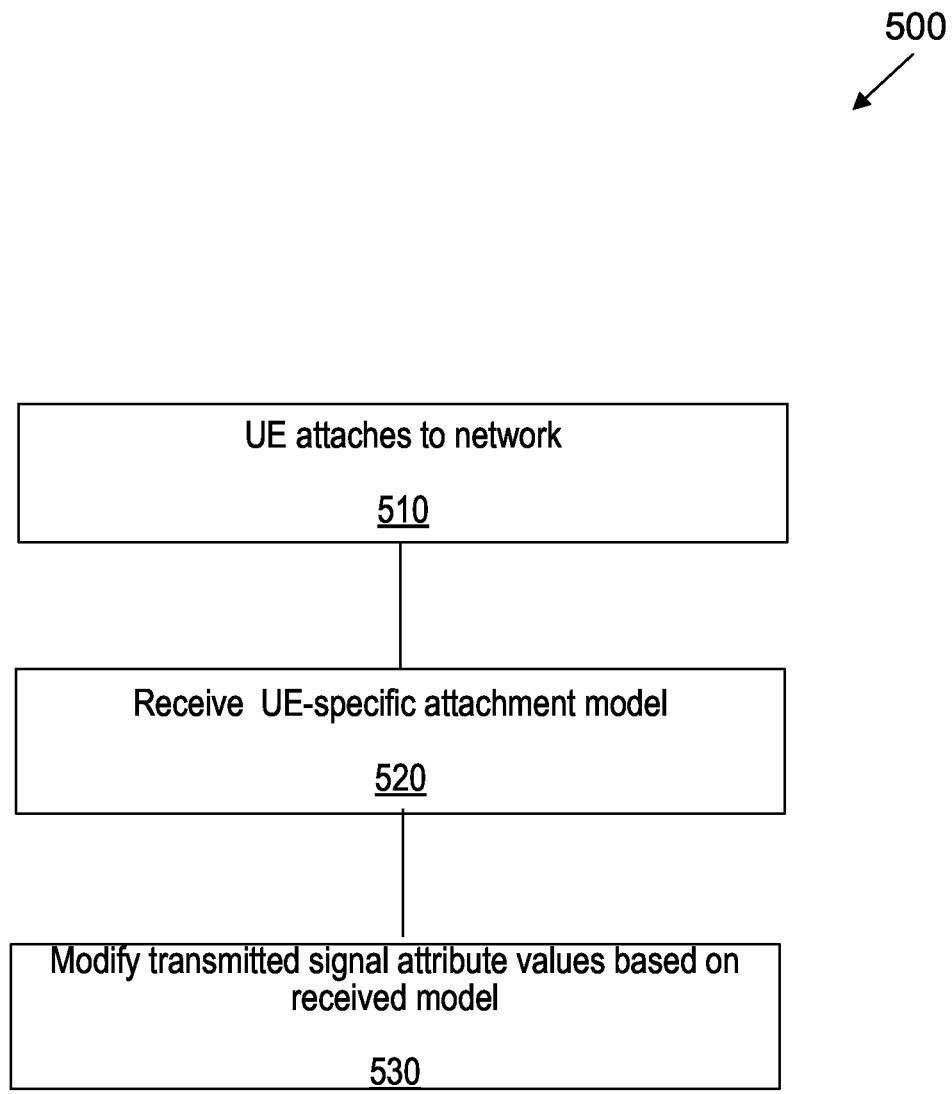
FIG. 5 is a flow chart representation of a method for wireless communication in accordance with one or more embodiments of the present technology.

FIG. 5 is a flow chart representation of a process 500 for wireless communication performed at a UE in accordance with one or more embodiments of the present technology. At act 510, a UE attaches to the network. At act 520, the UE accesses one or more UE-specific attachment model(s). Upon receiving the model(s), the UE proceeds to act 530 where it modifies its behavior by, for example, modifying the values of one or more channel transmission parameters before transmitting a message to the network.

Computer System

Figure 6:
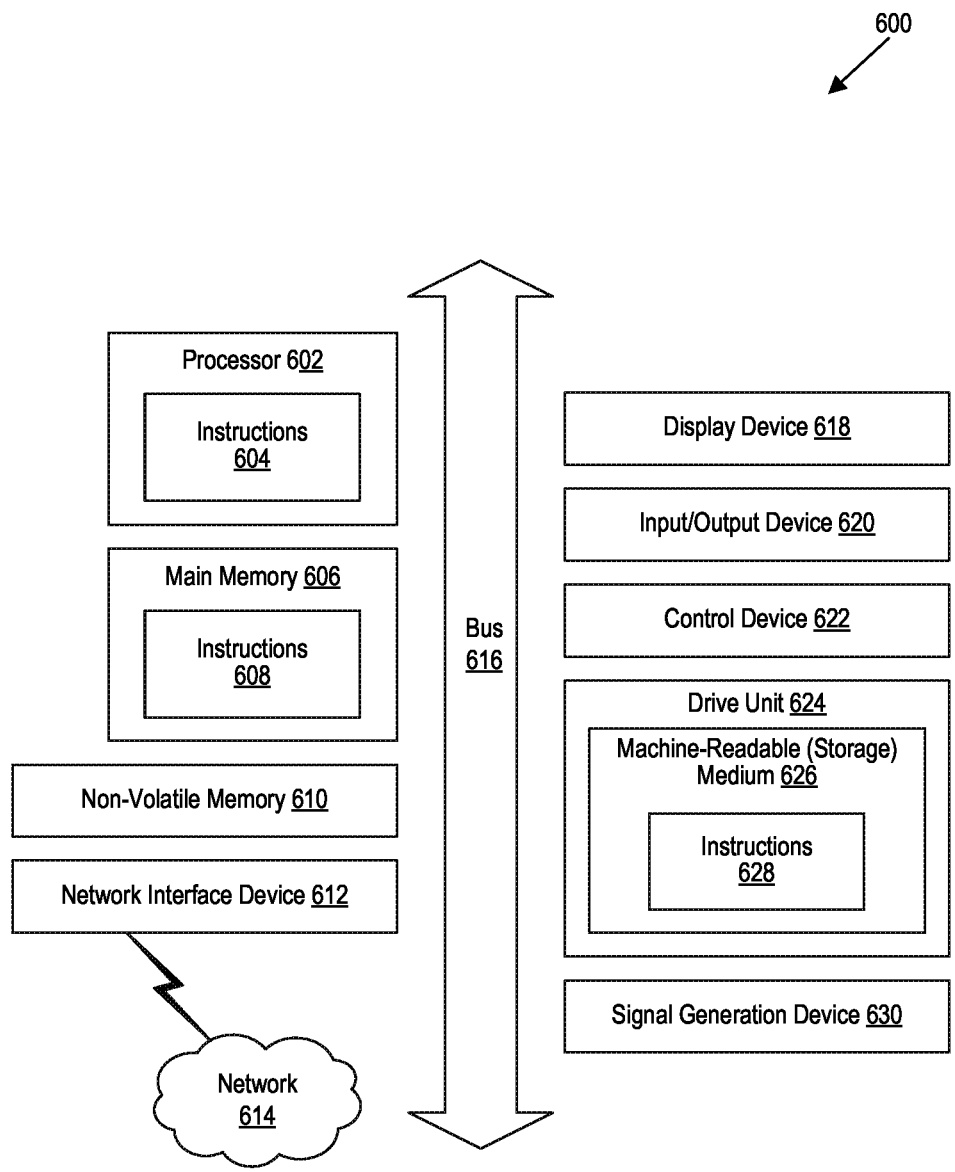
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

FIG. 7 illustrates an example model used to determine channel transmission parameters in accordance with one or more embodiments of the present technology.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A base station for wireless communication, comprising a processor that is configured to perform a method for location-based channel estimation, the method comprising:
   transmitting, to one or more terminal devices, a reference signal;
   receiving, from the one or more terminal devices, information comprising a location of the terminal device and a power measurement report of the reference signal;
   using the received location and power measurement report from the one or more terminal devices, generating a set of models for one or more signal attenuation parameters,
   wherein each model is used to estimate values for a corresponding channel transmission parameter at the one or more terminal devices or the base station;
   receiving, from a terminal device, an attachment notification to connect to the base station;
   identifying a subset of models from the set of models for the terminal device; and
   transmitting, to the terminal device, a packet comprising information of the identified subset of models.

2. The base station of claim 1, wherein at least one channel transmission parameter of the packet comprising the information of the identified subset of models is modified before transmitting the packet to the terminal device.

3. The base station of claim 1, wherein the set of models is stored at a data storage location communicatively coupled to the base station.

4. The base station of claim 1, wherein the set of models is stored at a data storage location communicatively coupled to the terminal device, and
   wherein the terminal device is configured to access the identified subset of models from the data storage location using the information in the received packet.

5. The base station of claim 1, wherein the information of the identified subset of models enables the terminal device to modify channel transmission parameter values of communication between the terminal device and the base station.

6. The base station of claim 1, wherein the one or more signal attenuation parameters comprise:

power,
signal strength,
signal to noise ratio,
signal to interference and noise ratio,
reference signal received power,
reference signal strength indication,
or any combination thereof.

7. The base station of claim 1, wherein the channel transmission parameter comprises:
modulation scheme,
multiple-input and multiple-output rank,
transmit power level,
channel bandwidth,
number of carriers,
number of sub-carriers,
sub-carrier spacing,
or any combination thereof.

8. The base station of claim 1, wherein the set of models comprises a first subset of models for uplink communication direction and a second subset of models for downlink communication direction.

9. The base station of claim 1, wherein the set of models comprises a first subset of models for the one or more signal attenuation parameters for a first frequency band and a second subset of models for the one or more signal attenuation parameters for a second frequency band.

10. The base station of claim 1, wherein the identified subset of models for the terminal device is selected using one or more frequency bands at which the terminal device will communicate with the base station.

11. The base station of claim 1, wherein the identified subset of models for the terminal device comprises a first subset of models for the one or more signal attenuation parameters for a first frequency band and a second subset of models for the one or more signal attenuation parameters for a second frequency band.

12. The base station of claim 1, wherein the set of models comprises at least one statistical model, machine learning model, or both.

13. A mobile device for performing optimized channel estimation, the mobile device comprising:
a communication interface configured to communicate with and connect to a set of base stations; and
a memory storing computer-executable instructions for:
transmitting one or more signals to attach to a base station among the set of base stations,
wherein the one or more signals comprise information about a location of the mobile device and a power measurement report of communications between the mobile device and the base stations;
receiving, from the base station, information of a set of models, each of which is used to estimate values for a corresponding channel transmission parameter at the mobile device or the base station,
wherein the set of models is generated using values of one or more signal attenuation parameters measured at the mobile device, the base station, or both; and
subsequent to receiving the information of the set of models, modifying channel transmission parameter values of packets transmitted from the mobile device to the base station.

14. The mobile device of claim 13, wherein the information of the received set of models is stored at a data storage location communicatively coupled to the terminal device, and
wherein the terminal device is configured to access the identified subset of models from the data storage location using the information in the received packet.

15. The mobile device of claim 13, wherein the one or more signal attenuation parameters comprise:
power,
signal strength,
signal to noise ratio,
signal to interference and noise ratio,
reference signal received power,
reference signal strength indication,
or any combination thereof.

16. The mobile device of claim 13, wherein the channel transmission parameter comprises:
modulation scheme,
multiple-input and multiple-output rank,
transmit power level,
channel bandwidth,
number of carriers,
number of sub-carriers,
sub-carrier spacing,
or any combination thereof.

17. The mobile device of claim 13, wherein the set of models comprises a first subset of models for uplink communication direction and a second subset of models for downlink communication direction.

18. The mobile device of claim 13, wherein the set of models comprises a first subset of models for the one or more signal attenuation parameters for a first frequency band and a second subset of models for the one or more signal attenuation parameters for a second frequency band.

19. The mobile device of claim 13, wherein the set of models comprises at least one statistical model, machine learning model, or both.

20. A method in a base station for performing location-based channel estimation, the method comprising:
transmitting, to one or more terminal devices, a reference signal;
receiving, from the one or more terminal devices, information comprising a location of the terminal device and a power measurement report of the reference signal;
using the received location and power measurement report from the one or more terminal devices, generating a set of models for one or more signal attenuation parameters,
wherein each model is used to estimate values for a corresponding channel transmission parameter at the one or more terminal devices or the base station;
receiving, from a terminal device, an attachment notification to connect to the base station;
identifying a subset of models from the set of models for the terminal device; and
transmitting, to the terminal device, a packet comprising information of the identified subset of models.

\* \* \* \* \*